United States Patent
Peterson et al.

[11] Patent Number: 6,163,697
[45] Date of Patent: Dec. 19, 2000

[54] METHOD FOR ASSIGNING COMMUNICATION RESOURCES

[75] Inventors: Larry Michael Peterson, West Dundee; Steppen Yi, Lisle; Daniel J. McDonald, Cary; Paul Joseph Cizek, Hawthorne Woods, all of Ill.

[73] Assignee: Motorola, Inc., Schaumburg, Ill.

[21] Appl. No.: 09/070,278

[22] Filed: Apr. 30, 1998

[51] Int. Cl.[7] .............................. H04Q 7/20; H04Q 7/00; H04Q 7/28; H04B 7/00

[52] U.S. Cl. .......................... 455/450; 455/509; 370/329; 370/341

[58] Field of Search .................................. 455/525, 450, 455/520, 518, 519, 517, 509; 370/328, 329, 340, 341

[56] References Cited

U.S. PATENT DOCUMENTS

| | | | |
|---|---|---|---|
| 5,123,110 | 6/1992 | Grube | 455/33.1 |
| 5,564,071 | 10/1996 | Liou et al. | 455/56.1 |
| 5,638,055 | 6/1997 | McDonald et al. | 340/825.5 |
| 5,708,711 | 1/1998 | Rosauer et al. | 380/21 |
| 5,761,193 | 6/1998 | Derango et al. | 370/312 |
| 5,761,618 | 6/1998 | Lynch et al. | 455/419 |
| 5,946,632 | 8/1999 | Yi et al. | 455/525 |

*Primary Examiner*—Fan Tsang
*Assistant Examiner*—Sheila Smith
*Attorney, Agent, or Firm*—Steven R. Santema

[57] ABSTRACT

A multi-site trunked radio communication system (100) in accordance with a preferred method (500) assigns communication resources (117–124) in response to an assigned or requested service level. The service level is determined based upon a number of parameters (128) including affiliated communication site, time, user override service data, network override service data and other service mode assignment data. The parameters are used to dynamically generate and periodically update a subscriber unit service participation mode (SPM) for each subscriber unit (114–116) operating in the communication system. Additionally, an existing service participation mode assignment may be overridden by the user from the subscriber unit and/or by a network operator/manager.

13 Claims, 7 Drawing Sheets

SUBSCRIBER UNIT ID: 710001

| | GEOGRAPHIC SITES | WORK SHIFT TIME | USER STATUS | TALK GROUP | USER OVERRIDE | NETWORK OVERRIDE | ... | VARIABLE n |
|---|---|---|---|---|---|---|---|---|
| MODE 0 | A,B,C | SHIFT 1 | ON-DUTY | X | Y | Y | | |
| MODE 1 | D,E,...X | SHIFT 2,3 | ON-DUTY | X | Y | Y | | |
| MODE 2 | A,B,C | SHIFT i | OFF-DUTY | X | Y | N | | |
| MODE 3 | | | | | | | | |
| ... | | | | | | | | |
| MODE n | | | | | | | | |

COMMUNICATION CONTROLLER AFFILIATION TABLE

| UNIT ID | TALK GROUP | SITE | OVERRIDE MODE | ASSIGNED MODE | PTT TIMER |
|---|---|---|---|---|---|
| 700001 | A | 1 | MODE 0 | MODE 0 | RESET |
| 700002 | B | 2 | NULL | MODE 0 | RESET |
| 700003 | A | 1 | MODE 0 | MODE 1 | SET |
| 700004 | C | 3 | MODE 2 | MODE 1 | RESET |
| ... | ... | ... | ... | ... | ... |
| 70000X | X | n | MODE n | MODE n | RESET/SET |

METHOD FOR ASSIGNING COMMUNICATION RESOURCES

FIELD OF THE INVENTION

The present invention relates to communication systems, and more particularly, to a method and apparatus for assigning communication resources in a communication system.

BACKGROUND OF THE INVENTION

Systems for providing communication services to groups of system users are well known in the art. For example, a conventional simulcast system incorporating a number of transmission sites is capable of covering a wide geographic area. Each site contains one or more repeater stations. The repeater stations are activated on a common radio frequency to broadcast desired information to users within the covered area.

Trunked radio communication systems can also provide wide area communication service, and can provide this service to specific users as well as specific groups of users. A trunked radio communication system employs both user identifications (IDs) and group IDs. Messages may be directed to intended single users or to groups of users with relative ease.

Current wide area trunked communication system subscriber units affiliate or register with a communication site which provides coverage and service capability in the geographic area. Subscriber units also affiliate with the communication site as an individual of a specific talkgroup. Talkgroups typically consist of many subscriber units of which each subscriber unit -may be affiliated to a unique communication site. Wide area system communication controllers are designed to provide group dispatch services by assigning radio frequency (RF) resources at sites where subscriber units of the service requesting talkgroup are affiliated. When system resources are not available to process a service request to all sites with an affiliated talkgroup member, the communications controller will issue a busy response for the service request. The busy response will be converted to a grant response when a communication resource at all sites with an affiliated talkgroup member becomes available. As wide area communication systems design technology expands and the wide area configuration can support more sites with more subscriber units, the opportunity for wide dispersion of the members of a talkgroup increases. With more talkgroup members affiliated over more sites, the probability of waiting for resource availability increases.

In an attempt to alleviate busy responses due to unavailable communication resources it is known in the art to assign to particular sites and/or particular subscriber units the status of "critical site" or "critical user", respectively. Communication resource assignments in this system are made based upon whether the site is a critical site or the user, located in a non-critical site, is a critical user. Sites that are neither critical nor contain critical users do not have to be available in order to process a communication request. If resources are available in a non-critical site, a resource is assigned; if a resource is not available, the communication request is processed without assigning a resource in the non-critical site. The status of a site as a critical site and a user as a critical user is made during system configuration and is stored as data within a system controller. During a call request, the system controller determines the sites that are designated as critical sites and the sites that contain at least one critical user. A communication resource, if available, is then allocated in each of these sites. A busy response only occurs if a resource is not available in each critical site and in each non-critical site containing a critical user. The requirement that a communication resource be assigned to a critical site will always exist, even if there are no users in that site whose participation in a communication request is required. The requirement that a communication resource be assigned to a non-critical site containing a critical user will also always exist even if the critical user's participation in the communication request is either unnecessary or unwanted. If a resource is not available in these sites, the communication request will be busied until a communication resource becomes available. Also, even if resources are available to reach a non-critical member in a non-critical site, a resource assignment may not be made.

Another known method attempting to manage resource assignment restricts subscriber units from affiliating with particular sites. A subscriber unit attempting to affiliate with a site that it is not authorized for service is denied service. If the site geographically overlaps with a site that the subscriber unit is authorized to use, it may attempt to affiliate with that site. However, the subscriber unit is often outside of the coverage of the authorized site, which is why it is attempting to affiliate with the unauthorized site in the first place. Thus, a subscriber unit in an unauthorized site is denied service entirely and does not negatively effect communication resource allocation. Authorized site information is programmed within the subscriber unit and is slaved within the communication system infrastructure, and in this regard is inflexible. It is also not possible to override the system should it become necessary to reach the user in spite of the site in which the user is located.

Thus, it will be appreciated that known resource allocation methods rely on particulars of the communication site and/or the communication unit. There is a need for an improved method of assigning communication resources in a communication system that allows for communication resource assignment based upon actual site and user service requirements.

DETAILED DESCRIPTION OF THE PREFERRED EMBODIMENTS

A multi-site trunked radio communication system in accordance with a preferred method assigns communication resources in response to an assigned or requested service level. The service level is determined based upon a number of parameters including affiliated communication site, time, user service override data, network service override data and other service mode assignment data. The parameters are used to dynamically generate and periodically update a subscriber unit service participation mode (SPM) for each subscriber unit operating in the communication system. Additionally, an existing service participation mode assignment may be overridden by the user from the subscriber unit and/or by a network operator/manager at any time.

Figure 1:
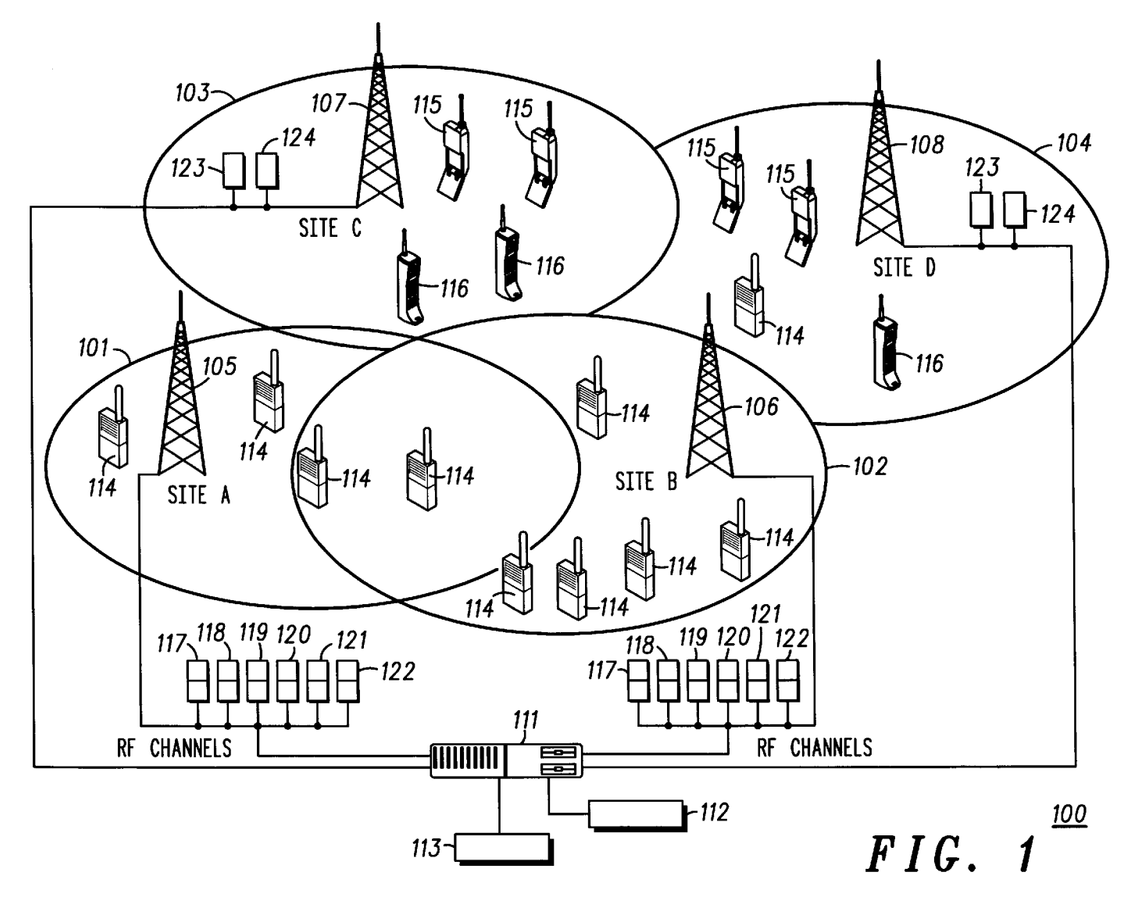
FIG. 1 is a schematic illustration of a communication system arranged to assign communication resources in accordance with a preferred embodiment of the present invention.

Referring to FIG. 1, multi-site trunked radio communication system 100 adapted to assign communication resources in accordance with a preferred embodiment of the present invention includes a plurality of communication sites designated site A through Site D, respectively, sites 101–104. It will be appreciated that while only four sites are shown, communication system 100 may include virtually any number of communication sites. Each site 101–104 includes one or more trunked base stations, respectively, base stations 105–108, which give each site capability of communicating on a number of communication resources. As used herein, a communication resource or communication channel refers to a radio frequency pair arranged in a frequency division multiple access (FDMA) manner. It will be appreciated that a communication resource may also be a time slot in a time division multiple access (TDMA) based communication system or a spreading code in a code division multiple access (CDMA) based communication system without departing from the fair scope of the present invention. As shown in FIG. 1, a plurality of communication resources, respectively communication channels 117–122, are assigned for providing communication services in sites 101 and 102 and a plurality of communication resources, respectively communication channels 123 and 124, are assigned for providing communication services in sites 103 and 104.

Each site is connected to a switch that is under control of a zone controller (collectively shown and referred to as zone controller 111) for operation as is well known in the art. Zone controller 111 includes a console 112 allowing a network operator or network manager to interface with the zone controller 111 and hence, manipulate operation of communication system 100. Zone controller 111 may also be in communication with a zone manager 113 as part of a larger distributed communication network, and interconnected with the public switched telephone network (PSTN) for providing PSTN interconnect services.

A number of subscriber units, respectively subscriber units 114, 115 and 116, operate in communication system 100. The subscriber units are associated in talkgroups based upon a common communication need such as the police department, the fire department, a taxi service, and the like. For example as shown in FIG. 1, subscriber units 114 are associated with a first talkgroup, Talkgroup X, subscriber units 115 are associated with a second talkgroup, Talkgroup Y, and subscriber units 116 are associated with a third talkgroup, Talkgroup Z. Virtually any number of talkgroups may be serviced by communication system 100. As seen in FIG. 1, subscriber units 114 of Talkgroup X are primarily affiliated with sites 101 and 102, however one member, subscriber unit 114', is shown "roaming" and is affiliated with site 104. Subscriber units 115 and 116, of Talkgroup Y and Talkgroup Z, respectively, are primarily affiliated with sites 103 and 104, although it should be understood that they may at some time roam into and affiliate with sites 101 and 102.

In an example of the shortcomings of a prior art implementation, if communication channels 123 and 124 are allocated for providing communication services to Talkgroup Y and Talkgroup Z, respectively, a communication request for Talkgroup X will receive a busy response as a result of subscriber unit 114' being affiliated with site 104. In certain situations, however, it may not be necessary for subscriber unit 114' to participate in a communication request directed to Talkgroup X. For example, subscriber unit 114' may be an off-duty police officer heading home and either not need to participate or not want to participate in the group communication request.

In accordance with a preferred embodiment of the present invention, a busy response is advantageously avoided in the foregoing example by defining a plurality of service participation modes, assigning subscriber units a particular service participation mode, and assigning communication resources as necessary based upon the service participation modes of each subscriber unit of a talkgroup. The Table 200 illustrated in FIG. 2, defines a plurality of service modes 125 and associated service types 126. Each mode consists of a specifically defined level of participation ("service level") for each service offered in communication system 100. For simplicity in describing the preferred embodiments of the present invention the service levels are limited to "Always", "Resources Available Only" and "Never". It will be readily appreciated that any number of service participation levels may be employed without departing from the fair scope of the present invention. Service participation levels, as used herein, are defined as follows. The service participation level "Always" is implemented such that service requests targeted for the specific subscriber unit will only be delivered if zone controller 111 determines that appropriate resources are available. If resources are not available for the targeted subscriber unit, the service request will be busied. The service participation level "Resources Available Only" is implemented such that service requests targeted for the specific subscriber unit will be delivered if zone controller 111 determines that appropriate resources are available, but the service request will not be busied if resources are not available. The service participation level "Never" is implemented such that service requests targeted for the specific subscriber unit are not delivered regardless of resource availability.

Figure 2:
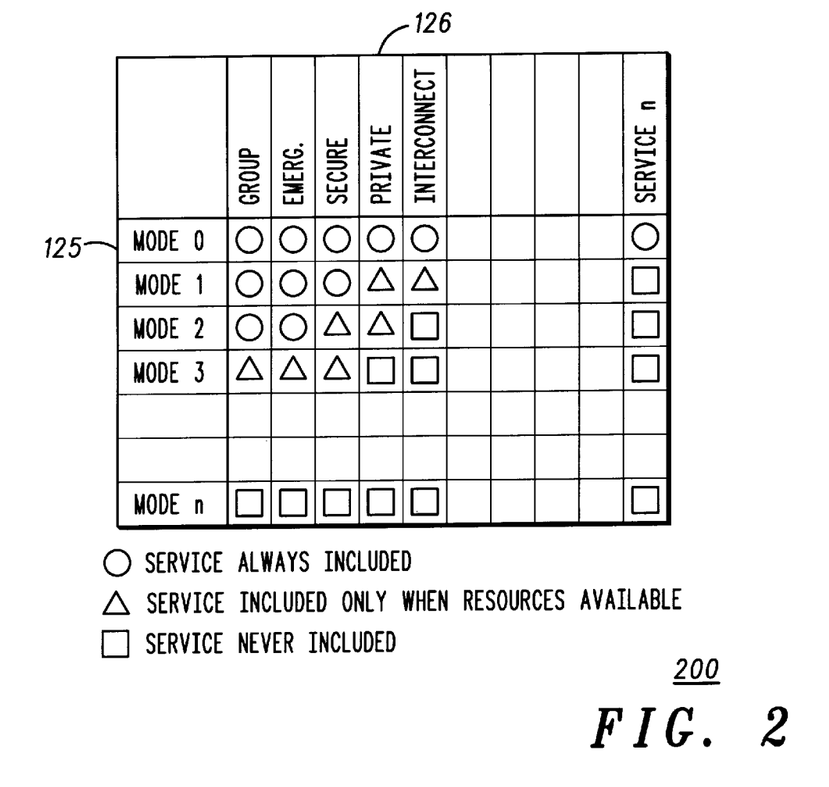
FIG. 2 is a chart illustrating subscriber unit service participation mode information.

As shown in FIG. 2, numerous service types 126 may be available within communication system 100. By way of example only, the services include services such as group—communication request directed to a talkgroup; emergency—communication request associated with an emergency response; secure—communication request requiring secure transmission; private—communication request between specific subscriber units; interconnect—communication request to receive connection to the public switched telephone network (PSTN); supergroup—service request to a dynamically configured talkgroup; multigroup—service request directed to a group of talkgroups; data—service request for data communication services; and many others. In a "Mode 0" service participation mode, the subscriber unit is set for "Always" service level for all available services. In a "Mode n" service participation mode, where n is the designation for a lowest service participation level, the subscriber unit is set for "Never" service level for all available services. For the various modes between Mode 0 and Mode n, various service levels are assigned depending on the desired service participation. For example, in "Mode 2" service participation mode the subscriber unit is assigned an "Always" service level for group and emergency services, "Resources Available Only" for secure and private services and "Never" for the remaining services. As will be appreciated numerous combinations of services and service levels may be combined in the present invention.

Figure 3:
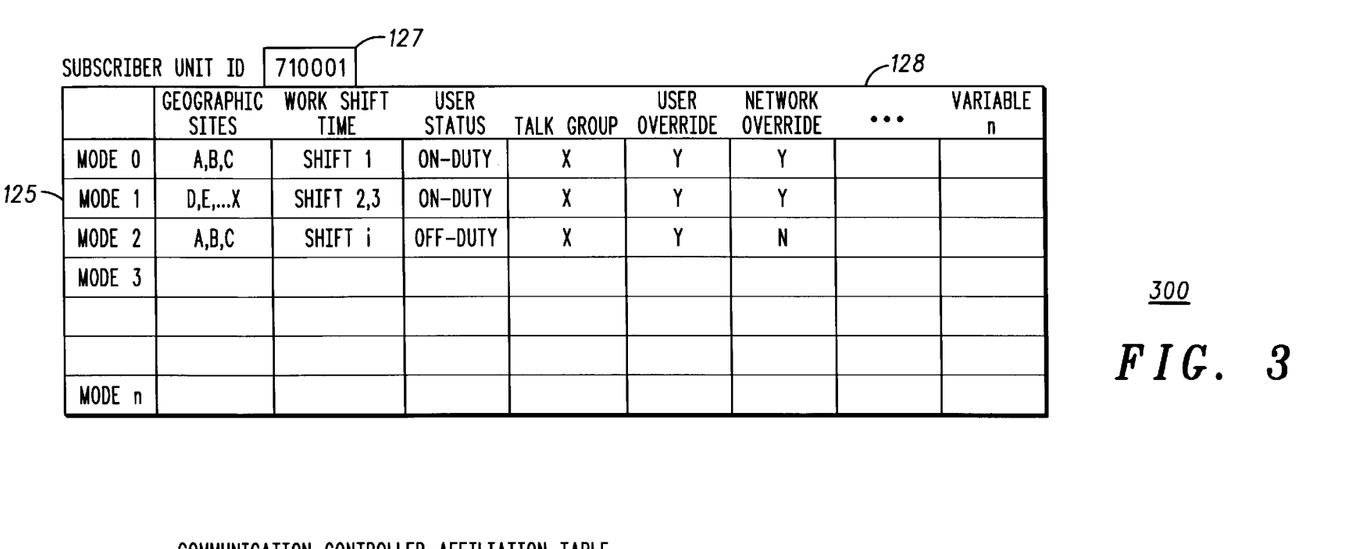
FIG. 3 is a chart illustrating subscriber unit service participation mode assignment information.

The Table 300 illustrated in FIG. 3 is a multi-variable service participation mode assignment table (MVSPMA) defining each service participation mode 125 for a particular subscriber unit 127 based upon a plurality of service participation parameters 128. In the example shown in FIG. 3 service participation parameters 128 include: geographic sites; work shift/time; network manager input; talkgroup affiliation; user override authority, network manager override authority and others as may be defined. Data are inserted in the corresponding location in Table 300 for each service participation mode 125, Mode 0–Mode n, and for each service participation parameter 128. As seen in FIG. 3, a highest service level, i.e., the Mode 0 service participation mode, is defined for subscriber unit 127 while in sites A, B and C, during the first shift and when the user is reported "on-duty." Other service participation modes 125 are likewise defined. Two additional columns respectively labeled "User Override" and "Network Override" indicate the ability of either the user and/or the network manager to override an existing service participation mode. When authorized, indicated by a "Y", the user and/or the network manager may, respectively, override the otherwise assigned service participation mode.

Figure 4:
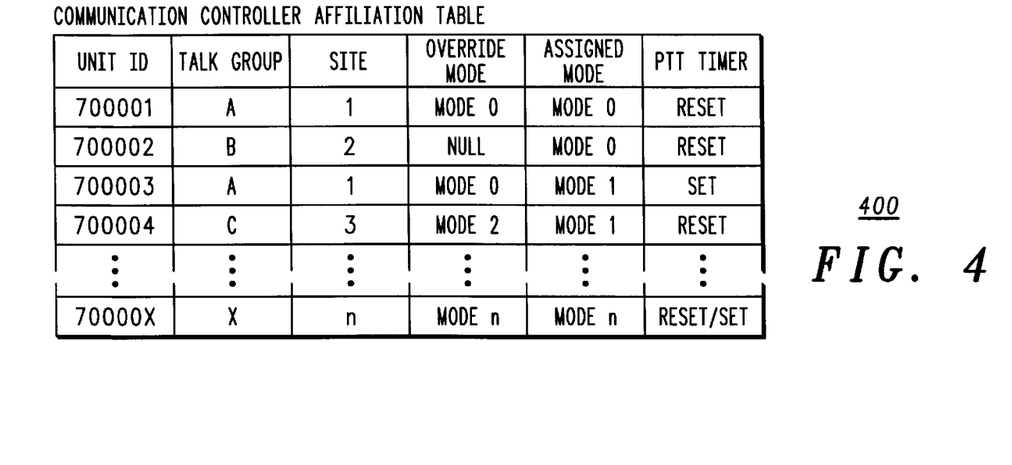
FIG. 4 is a chart illustrating subscriber unit site affiliation information.

The Table 400 illustrated in FIG. 4 contains affiliation information relating to each subscriber unit operating in communication system 100 and utilized by zone controller 111 for responding to service requests. For each subscriber unit affiliated with a communication site in the communication system, a subscriber unit entry is made in the "Unit ID" column. For each affiliated subscriber unit several associated data are entered into Table 400. As can be seen in FIG. 4, the user's talkgroup, affiliated communication site and assigned service participation mode are retained in Table 400. Table 400 also contains entries for an override service participation mode and a push-to-talk (PTT) timer status. The push-to-talk timer is associated with a push-to-talk override service participation mode that will be explained more fully below. During operation, and in response to communication requests, zone controller 111 refers to Table 400 which conveniently provides information relating to each affiliated subscriber unit that is useful in processing a communication request, and more particularly, to assigning communication resources. That is, Table 400 contains the talkgroup membership, the affiliated communication site and the present service participation mode of each subscriber unit.

It should be understood that zone controller 111, zone manager 113 and other related elements of communication system 100 possess numerous processing resources. It would be a relative simple task for any one of these elements to include processing capability and a database or databases for respectively generating and storing Tables 200, 300 and 400 and for implementing the following method for assigning communication resources.

Figure 5A:
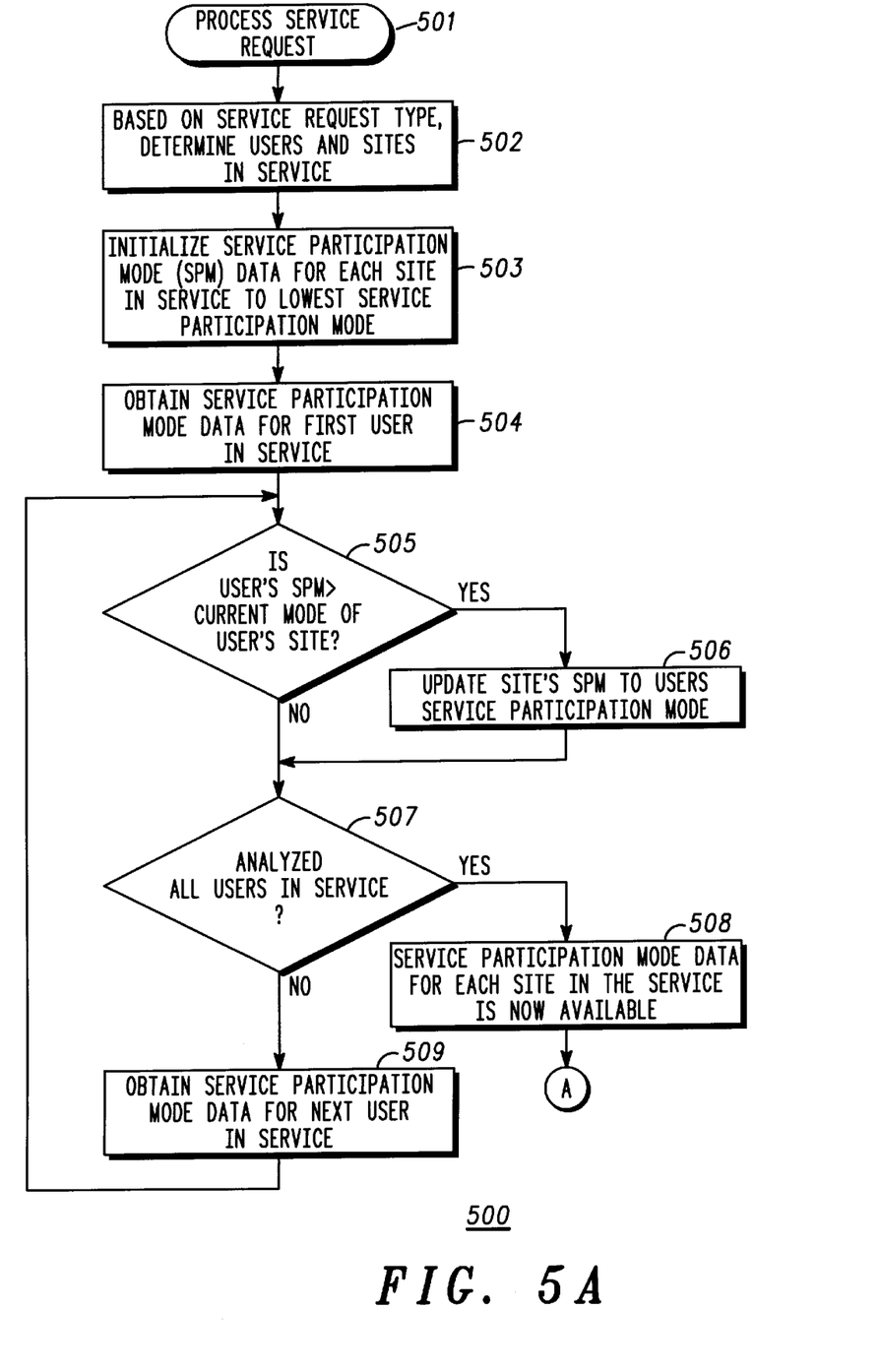
FIG. 5A and FIG. 5B are a flow chart illustrating a method of assigning communication resources in accordance with a preferred embodiment of the present invention.
Figure 5B:
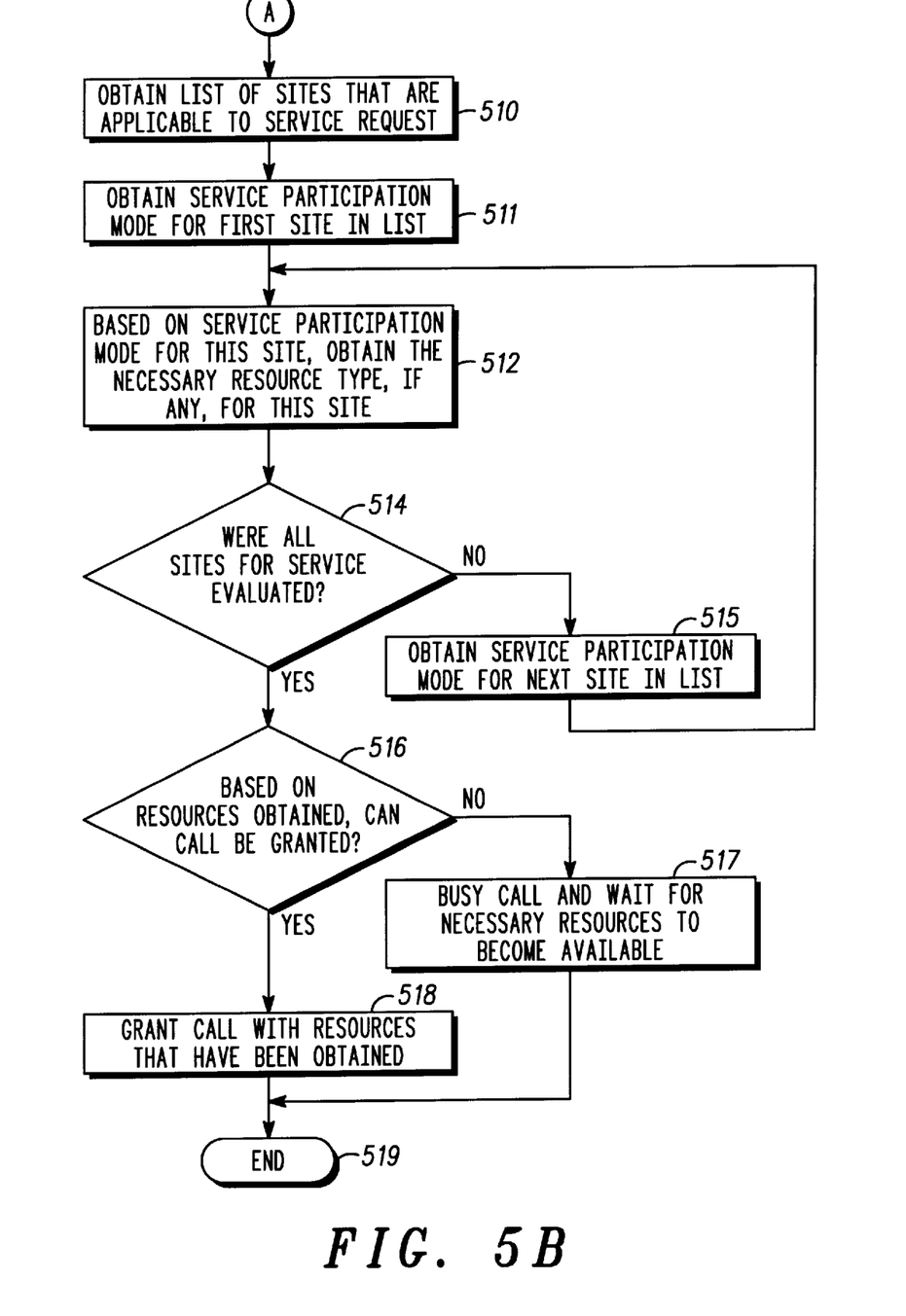

Referring now to FIG. 5, a method 500 of processing a communication request, and particularly of assigning communication resources, in accordance with a preferred embodiment of the present invention is shown and begins at step 501. At step 502, based upon the service request, zone controller 111 determines the users and the sites affected by the communication request. At step 503, a site service participation mode (SPM) for each communication site affected by the communication request is set to a lowest level, i.e., no participation in the communication request. At step 504 the service participation mode (SPM) data for a first of the affected users is obtained. As seen in FIG. 4, a user has an assigned service participation mode and an override service participation mode. For purposes of assigning communication resources, zone controller 111 looks to the assigned service participation mode and any non-null override service participation mode for the affected user. If there is a non-null override service participation mode, zone controller uses the highest of the non-null override service participation modes for assigning communication resources. Otherwise, if there are no non-null override service participation modes, zone controller 111 uses the assigned service participation mode for assigning communication resources. It should be noted that while only one override mode is shown in FIG. 4, several override modes may be included. In a preferred embodiment of the present invention, Table 400 includes at least a push-to-talk override service participation mode, a user initiated override service participation mode and a network operator/manager initiated override service participation mode. It should also be understood that as used herein Mode 0 represents a "highest" service participation mode in that it represents a highest level of service for a particular subscriber unit, while Mode n represents a lowest service participation mode in that it represents a lowest level of service for a particular subscriber unit. At step 505, the user's service participation mode, either the assigned service participation mode or the highest of any existing non-null override service participation modes as determined in step 504, is compared to the site service participation mode of its affiliated site. If the user's service participation mode is at a higher service level than the site service participation mode, for example, the user's service participation mode is Mode 1 while the site service participation mode is Mode 4, the site service participation mode is set to the user's service participation mode at step 506. If not, no change is made to the site service participation mode, and at step 507, zone controller checks whether all users have been evaluated. If not, the service participation mode for the next user is obtained, step 509, and steps 505–507 are repeated. Otherwise, at step 508, service participation mode data is now available for each site affected by the communication request.

At step 510, a list of sites applicable to the communication request is obtained, and the first site from the list of sites is obtained at step 511. At step 512, based on the service participation mode for the site, if necessary, a communication resource for the site is obtained. If all sites have not been evaluated, step 514, the next site on the list is obtained, step 515, and steps 512 and 514 are repeated.

After all sites have been evaluated, at step 516, zone controller 111 determines if there are sufficient resources available to grant the communication request. That is, for each site, from steps 512 through 515, requiring a communication resource, was a communication resource assigned? These are the communication sites having a sufficiently high service participation mode as to require a communication resource. For communication sites having a service participation mode that requires a communication resource only if available, the communication resource is assigned, if available. For communication sites having a service participation mode that requires communication resources not be assigned even if available, none is assigned even if available. If required communication resources are not available at the respective sites, a busy response is issued until sufficient resources are available at step 517. Otherwise, at step 518, the communication request is granted with the assigned communication resources and method 500 ends at step 519.

Figure 6:
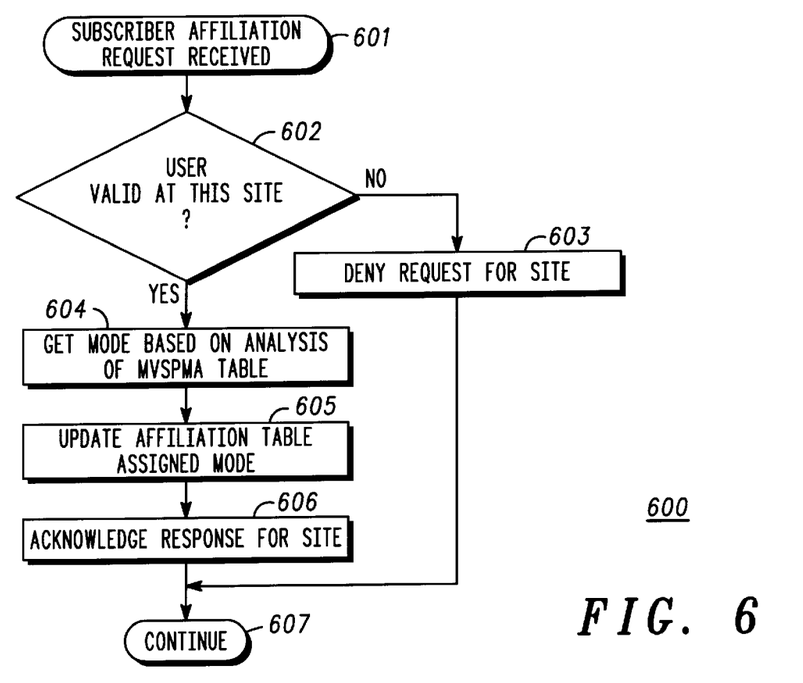
FIG. 6 is a flow chart illustrating service participation mode assignment in accordance with a preferred embodiment of the present invention.

Referring now to FIG. 6–FIG. 10, a number of processes by which data in Tables 200, 300 and 400 are generated and periodically updated are illustrated in flow chart form. FIG. 6 illustrates a method 600 for service participation mode assignment for a subscriber unit upon initial affiliation with a communication site. Method 600 begins at step 601, and at step 602, the user is verified as being valid at the particular communication site. Subscriber units may be prohibited from certain communication sites, and if the subscriber unit is not permitted to affiliate with the present site, it is denied an affiliation response, step 603, and system processing continues at step 607.

At step 604 Table 300 is referenced to determine the appropriate user service participation mode. Thus, based upon the communication site that the user is affiliating with, time, status, and other data contained in Table 300, a service participation mode is assigned for the user, and Table 400 is updated to reflect the present "assigned" service participation mode for the user, step 605. Next, an acknowledgement is communicated to the subscriber unit, step 606 and system processing continues at step 607.

As noted above, push-to-talk is one of several override service participation modes. A push-to-talk (PTT) request is an indication that the user is initiating a communication request or desires to join an ongoing communication. In response, it may be necessary to override the presently assigned service participation mode to ensure that a communication resource is allocated in response to this request for communication services. The override service participation mode ensures a communication resource assignment so that the initiating user's communication is heard by the appropriate other subscriber units, and so that the initiating subscriber unit receives communications from the other subscriber units in response thereto for a predetermined amount of time.

Figure 7:
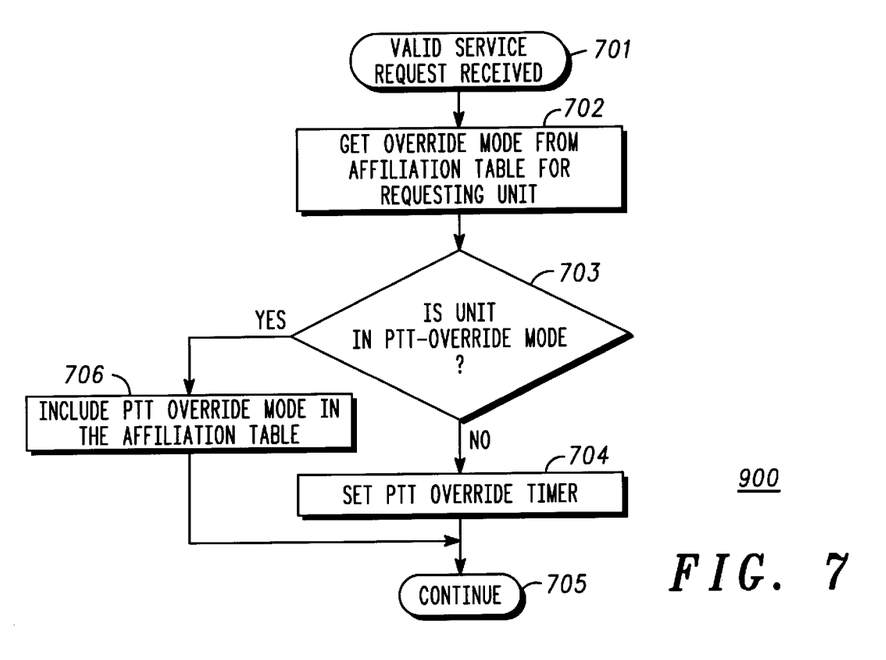
FIG. 7 is a flow chart illustrating service participation mode assignment modification in accordance with a preferred embodiment of the present invention.
Figure 8:
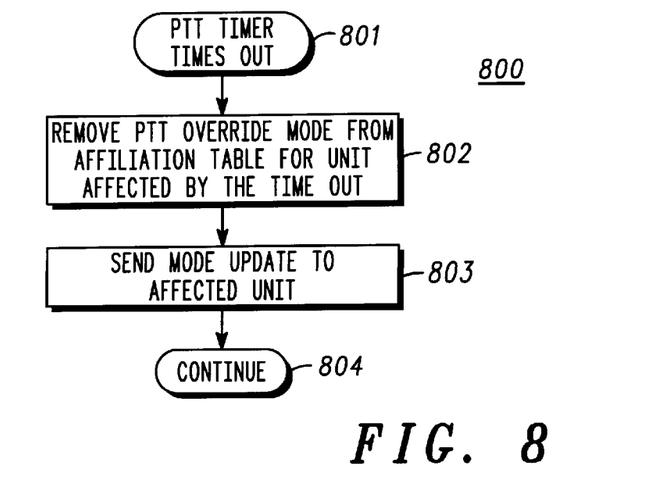
FIG. 8 is a flow chart illustrating resetting of a service participation mode modification.

Referring to FIG. 7 and FIG. 8, a method 700 for overriding an assigned service participation mode resulting from a push-to-talk service request and a method 800 for resetting an override service participation mode are respectively shown. Method 700 begins at step 701 with a valid service request and at step 702 the push-to-talk override service participation mode for the subscriber unit is obtained from Table 400. If at step 703 the subscriber unit is already in push-to-talk override as indicated by the push-to-talk override mode already being included in Table 400, a push-to-talk timer is set, step 704, and the method returns at step 705. Otherwise, at step 706 the push-to-talk override service participation mode is included in Table 400. In a preferred embodiment the override service participation mode may be the assigned service participation mode raised to the next highest service participation mode. Alternatively, the override service participation mode may be the lowest service participation mode that will allow assignment of a communication resource. Still another preferred alternative is to make the override service participation mode the highest service participation mode, i.e., Mode 0, to ensure resource assignment. The push-to-talk timer is then set at step 704 and system processing continues at step 705.

It is undesirable to leave override service participation modes in Table 400 as they may cause the unnecessary assignment of communication resources, and/or an associated busy response. Therefore, the push-to-talk timer limits the time over which the push-to-talk override service participation mode will remain in Table 400. Referring to FIG. 8, a method 800 of resetting the override service participation mode starts at step 801 upon expiration of the push-to-talk timer initialized in method 700. At step 802, the push-to-talk override service participation mode is removed from Table 400. That is, the push-to-talk override service participation mode in Table 400 is set to a null value, i.e., no override service participation mode assignment. This ensures that communication resources will not be assigned as a result of the push-to-talk override after expiration of the push-to-talk timer. At step 803 a mode update message is sent to the affected subscriber unit, and the Method 800 returns at step 804.

Figure 9:
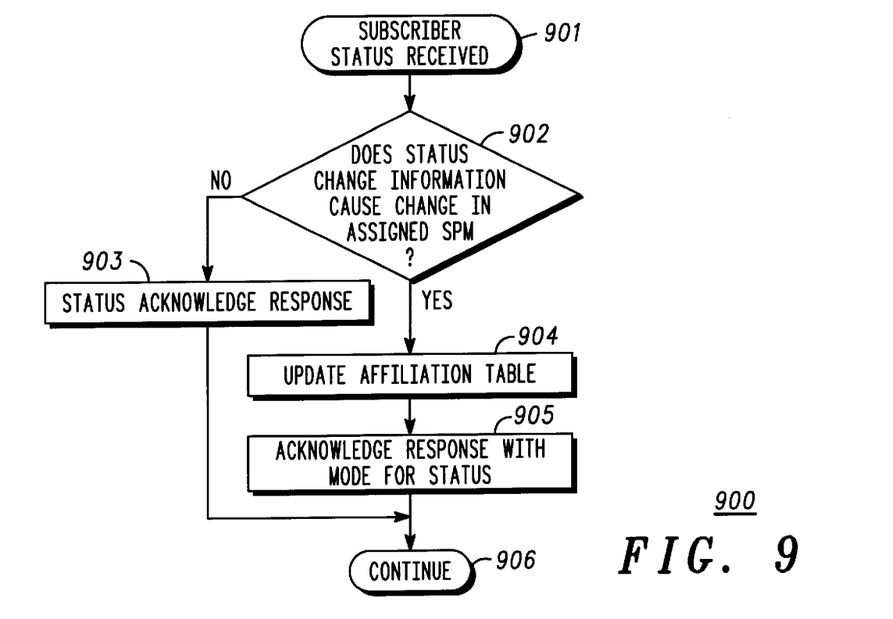
FIG. 9 is a flow chart illustrating service participation mode assignment modification in accordance with a first alternate preferred embodiment of the present invention.

Referring now to FIG. 9, the assigned service participation mode may change as a result of a change in the status of a subscriber unit. For example, in Table 300, one of the assignment parameters is the "User Status." In a preferred embodiment illustrated in Table 300, the "User Status" may be whether or not the person is "on-duty." Other status parameters may include at lunch, on break, on-duty but not receiving communications, and other status information for the subscriber unit. The status information may be provided by the user via the subscriber unit or by the network operator via console 112. A method 900 for updating a service participation mode in response to a change in status information begins at step 901 with the receipt of status information. At step 902 a check is made of Table 300 to determine if the status information causes a change in the assigned mode. If not, at step 903 an acknowledgement of the change in status information is sent to the subscriber unit, and the system processing continues at step 906. Otherwise, the assigned service participation mode is changed accordingly and Table 400 is updated, step 904. An acknowledgment of the change in status and service participation mode is sent to the subscriber unit at step 905, and system processing continues at step 906.

Figure 10:
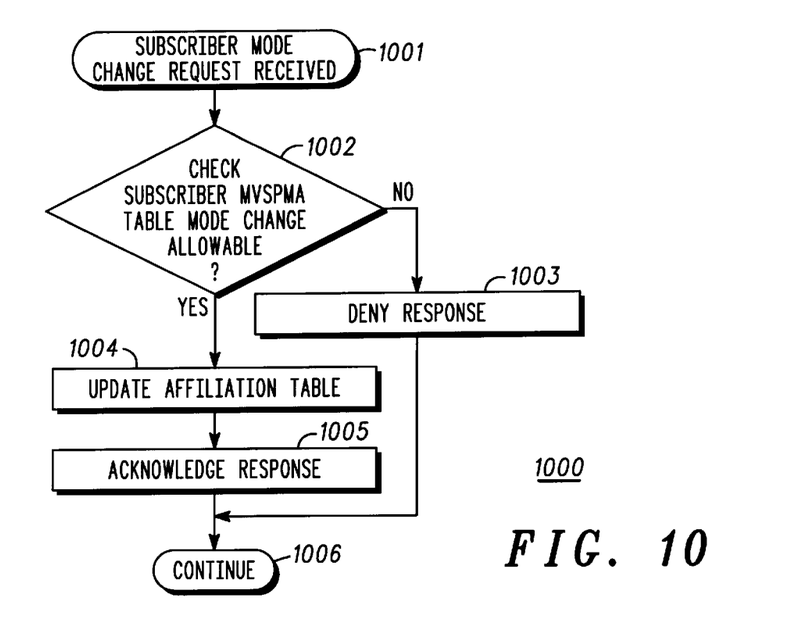
FIG. 10 is a flow chart illustrating service participation mode assignment modification in accordance with a second alternate preferred embodiment of the present invention.

In a preferred embodiment of the present invention, the user may initiate an override service participation mode as may the network operator/manager and/or the zone manager. The user may request an override service participation mode from the subscriber unit, while the network operator/manager or zone manager may request an override for a particular user from console 112. The override service participation mode may be a higher or lower service participation mode. For example, a network operator may override a user's assigned service participation mode to a higher service participation mode so that a communication resource is assigned and the user is reached even if the assigned service participation mode would not permit resource allocation. With reference to FIG. 10, a method 1000 of updating a service participation mode in response to a request for override from either a user or a network operator begins at step 1001 with a request to override a particular subscriber's assigned service participation mode, i.e., the assigned service participation mode from Table 300. At step 1002, a check is made to determine whether the requesting party, either the user or the network entity (i.e., operator, manager, etc.), is authorized to initiate the override. As noted above, Table 300 contains information pertaining to who may authorize a service participation mode override. If the requesting party does not have authority to initiate an override, the override request is denied, step 1003, and method 1000 returns at step 1006. Otherwise, the override service participation mode changed is made, and Table 400 is updated to include the requested override service participation mode, step 1004. At step 1005 an acknowledgement of the override is sent to the subscriber unit and the system processing continues at step 1006.

It may be undesirable to leave the user or network initiated override service participation mode in place indefinitely. In this regard, a timer, similar to the aforementioned push-to-talk timer, may be set. Upon expiration of the timer, the override service participation mode is then changed to a null value in a manner similar to that illustrated in FIG. 8. As noted, one or more override service participation modes may be included in Table 400 for a particular subscriber unit. Each override service participation mode may also have an associated timer. Thus at any moment in time one or more override service participation modes may be included in Table 400 and subject to an associated timer. As noted, for purposes of communication resource allocation, the assigned service participation mode or a highest of any non-null override service participation modes is used.

Basing communication resource allocation upon desired service levels as opposed to geographic locations or specific subscriber units greatly enhances system flexibility. In addition, communication resources are more effectively allocated and the potential for busy responses is reduced. One of ordinary skill in the art will appreciate that numerous service levels as well as parameters for assigning service levels may be employed without departing from the fair scope of the present invention. Many additional changes and modifications could be made to the invention without departing from the fair scope and spirit thereof. The scope of some changes is discussed above. The scope of others will become apparent from the appended claims.

We claim:

1. A method of assigning communication resources in a communication system, the communication system arranged to provide communication services to a plurality of subscriber units, each subscriber unit being affiliated with one of a plurality of communication sites, the method comprising:

for each subscriber unit determining a subscriber unit service level from among a plurality of subscriber unit service levels available to affiliated subscriber units;

assigning for each communication site a communication resource based upon file subscriber unit service level of an affiliated subscriber unit; and modifying a subscriber unit service participation mode in response to a change in status of the subscriber unit to provide a modified subscriber unit service participation mode.

2. A method of assigning communication resources in a communication system, the communication system arranged to provide communication services to a plurality of subscriber units, each subscriber unit being affiliated with one of a plurality of communication sites, the method comprising:

for each subscriber unit determining a subscriber unit service level from among a plurality of subscriber unit service levels available to affiliated subscriber units;

assigning for each communication site a communication resource based upon the subscriber unit service level of an affiliated subscriber unit; and providing an override service participation mode in response to a request for override by one of a user and a network entity, and wherein the subscriber unit service level is based upon one of an assigned service participation mode and a highest non-null override service participation mode.

3. A method of assigning communication resources in a communication system, the communication system arranged to provide communication services to a plurality of subscriber units, each subscriber unit being affiliated with one of a plurality of communication sites, the method comprising:

for each subscriber unit determining a subscriber unit service level from among a plurality of subscriber unit service levels available to affiliated subscriber units;

assigning for each communication site a communication resource based upon the subscriber unit service level of an affiliated subscriber unit; and in response to a service request, granting the service request if required resources are available and busying the service request if the required resources are not available.

4. A method for assigning communication resources in a communication system, the communication system including a plurality of geographically dispersed communication sites and a plurality of subscriber units, each subscriber unit being affiliated to one of the plurality of communication sites, the method comprising the steps of:

assigning for each subscriber unit a service participation mode from among a plurality of service participation modes available to affiliated subscriber units, the service participation mode corresponding to a level of communication services available for the subscriber unit;

assigning to each communication site a site service participation mode corresponding to a highest service participation mode of the subscriber units affiliated with the communication site;

assignee a communication resource within each communication site based upon the site service participation mode responsive to a service request; and setting an override subscriber unit service participation mode in response to a request for communication services by the subscriber unit.

5. The method of claim 4, wherein the override subscriber unit service participation mode comprises a highest level service participation mode.

6. The method of claim 4, wherein the override subscriber unit service participation mode comprises a next higher service participation mode.

7. The method of claim 4, comprising resetting the override subscriber unit service participation mode after a predetermined time period.

8. A method for assigning communication resources in a communication system, the communication systems including a plurality of geographically dispersed communication sites and a plurality of subscriber units, each subscriber unit being affiliated to one of the plurality of communication sites, the method comprising the steps of:

assigning for each subscriber unit a service participation mode from among a plurality of service participation modes available to affiliated subscriber units, the service participation mode corresponding to a level of communication services available for the subscriber unit and identifying a service level for each of a plurality of service types;

assigning to each communication site a site service participation mode corresponding to a highest service participation mode of the subscriber units affiliated with the communication site; and assigning a communication resource within each communication site based upon the site service participation mode responsive to a service request.

9. The method of claim 8, wherein the service level comprises one of the group of service levels comprising: always, resources available and never.

10. The method of claim 8, comprising the step of modifying a subscriber unit service participation mode in response to a change in status of the subscriber unit to provide a modified subscriber unit service participation mode.

11. The method of claim 8, comprising the step of, in response to a service request, granting the service request if required resources are available and busying the service request if the required resources are not available.

12. The method of claim 8, comprising the step of setting an override subscriber unit service participation mode in response to a request for override by at least one of a user and a network operator.

13. The method of claim 8, wherein the step of assigning for each subscriber unit a service participation mode comprises assigning a service participation mode based upon one of an assigned service participation mode and a highest non-null override service participation mode.

* * * * *

UNITED STATES PATENT AND TRADEMARK OFFICE
CERTIFICATE OF CORRECTION

| | | |
|---|---|---|
| PATENT NO. | : 6,163,697 | Page 1 of 1 |
| DATED | : December 19, 2000 | |
| INVENTOR(S) | : Larry M. Peterson, et al. | |

It is certified that error appears in the above-identified patent and that said Letters Patent is hereby corrected as shown below:

In claim 8, "systems" should be --system--

Signed and Sealed this

Fifth Day of June, 2001

*Attest:*

*Attesting Officer*

NICHOLAS P. GODICI

*Acting Director of the United States Patent and Trademark Office*